(12) United States Patent
Koranne et al.

(10) Patent No.: US 10,592,628 B2
(45) Date of Patent: Mar. 17, 2020

(54) PARASITIC EXTRACTION BASED ON COMPACT REPRESENTATION OF PROCESS CALIBRATION DATA

(71) Applicant: Mentor Graphics Corporation, Wilsonville, OR (US)

(72) Inventors: Sandeep Koranne, West Linn, OR (US); Sridhar Srinivasan, Tualatin, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 115 days.

(21) Appl. No.: 15/873,884

(22) Filed: Jan. 17, 2018

(65) Prior Publication Data

US 2019/0220552 A1    Jul. 18, 2019

(51) Int. Cl.
*G06F 17/50*    (2006.01)

(52) U.S. Cl.
CPC ........ *G06F 17/505* (2013.01); *G06F 17/5081* (2013.01); *G06F 17/5036* (2013.01); *G06F 2217/84* (2013.01)

(58) Field of Classification Search
CPC ............... G06F 17/505; G06F 17/5081; G06F 17/5036; G06F 2217/84
See application file for complete search history.

(56) References Cited

U.S. PATENT DOCUMENTS

| | | | | | |
|---|---|---|---|---|---|
| 5,903,469 | A * | 5/1999 | Ho | ........... | G06F 17/5081 716/115 |
| 7,373,620 | B1 * | 5/2008 | Lenahan | ........... | G06F 17/5036 716/115 |
| 8,438,505 | B2 * | 5/2013 | Tsai | ........... | G06F 17/5081 716/106 |
| 8,640,077 | B1 * | 1/2014 | Groves | ........... | G06F 17/5036 716/136 |
| 8,689,157 | B1 * | 4/2014 | Lo | ........... | G06F 17/5081 700/110 |
| 8,732,640 | B1 * | 5/2014 | Krishnan | ........... | G06F 17/5068 716/110 |
| 8,826,213 | B1 * | 9/2014 | Ho | ........... | G06F 17/5036 716/110 |
| 8,863,055 | B2 * | 10/2014 | Nieuwoudt | ........... | G06F 17/5081 716/111 |
| 8,904,337 | B2 * | 12/2014 | Yang | ........... | G06F 17/5081 716/136 |
| 9,245,079 | B1 * | 1/2016 | Huang | ........... | G06F 17/5072 |
| 9,471,738 | B2 * | 10/2016 | Chou | ........... | G06F 17/5081 |
| 9,798,840 | B1 * | 10/2017 | Ginetti | ........... | G06F 17/5081 |
| 9,886,541 | B2 * | 2/2018 | Allen | ........... | G06F 17/5077 |
| 10,095,825 | B2 * | 10/2018 | Han | ........... | G06F 17/5081 |
| 2003/0046645 | A1 * | 3/2003 | Boehm | ........... | G06F 17/5022 716/106 |
| 2006/0053394 | A1 * | 3/2006 | Batterywala | ........... | G06F 17/5081 716/115 |

(Continued)

*Primary Examiner* — Nha T Nguyen (57) ABSTRACT

Aspects of the disclosed technology relate to techniques of parasitic extraction using compact representation of process calibration data. Geometric information of a layout feature in the layout design comprising geometric parameters is extracted. Parasitic values associated with the layout feature are then computed based on the geometric information and one or more executable files selected in a plurality of executable files which are a compact representation of process calibration data.

18 Claims, 4 Drawing Sheets

Flow chart 400

(56) References Cited

U.S. PATENT DOCUMENTS

| | | | |
|---|---|---|---|
| 2009/0187866 A1* | 7/2009 | Ou | G06F 17/5009 |
| | | | 716/136 |
| 2011/0066991 A1* | 3/2011 | Tsunoda | G06F 17/5036 |
| | | | 716/115 |
| 2011/0078642 A1* | 3/2011 | Elfadel | G06F 17/5036 |
| | | | 716/106 |
| 2012/0022846 A1* | 1/2012 | White | G06F 17/5068 |
| | | | 703/14 |
| 2012/0185807 A1* | 7/2012 | Tsai | G06F 17/5081 |
| | | | 716/52 |
| 2012/0210283 A1* | 8/2012 | Li | G06F 17/5018 |
| | | | 716/112 |
| 2013/0091480 A1* | 4/2013 | Horlacher | G06F 17/5081 |
| | | | 716/113 |
| 2013/0305194 A1* | 11/2013 | Wang | G06F 17/5081 |
| | | | 716/52 |
| 2014/0282337 A1* | 9/2014 | Yuh | G06F 17/5081 |
| | | | 716/115 |
| 2014/0304670 A1* | 10/2014 | Su | G06F 17/5081 |
| | | | 716/111 |
| 2014/0310675 A1* | 10/2014 | Liu | G06F 17/5036 |
| | | | 716/136 |
| 2016/0232270 A1* | 8/2016 | Chou | G06F 17/5081 |
| 2017/0161425 A1* | 6/2017 | DeHond | G06F 17/5081 |

* cited by examiner

PARASITIC EXTRACTION BASED ON COMPACT REPRESENTATION OF PROCESS CALIBRATION DATA

FIELD OF THE DISCLOSED TECHNOLOGY

The present disclosed technology relates to the field of circuit design verification. Various implementations of the disclosed technology may be particularly useful for parasitic extraction.

BACKGROUND OF THE DISCLOSED TECHNOLOGY

Parasitic effects are becoming more pronounced with the advent of deep submicron process technologies. Parasitic capacitances, parasitic resistances and parasitic inductances are commonly called parasitic devices, parasitic components, or simply parasitics. Even though the recent processing technology advancements of copper interconnect reduces the effect of parasitic resistance and the low k (<3) dielectric material reduces the effect of parasitic capacitance, the continued scaling down of the feature size keeps the parasitic effects dominant, and makes it a necessity to account accurately for parasitic effects for large and complicated interconnect structures.

To account for parasitic effects in both designed devices and required wiring interconnects of an electronic circuit, parasitic extraction needs not only information of a design itself such as the top view layout of the design in the form of input polygons on a set of layers, a mapping to a set of devices and pins (derived using a layout-versus-schematic (LVS) tool), and a cross sectional understanding of these layers, but also process calibration data. Process calibration data are tied to manufacturing processes and are supplied to designers by manufacturers. A manufacturer typically runs simulations on a large number of test structures to obtain process calibration data for various patterns in the form of empirical formulas, look-up tables or both, which is sometimes referred to as a pattern library. A parasitic extraction tool can then extract geometric parameters of layout features from the layout design and calculate parasitic values based on the extracted geometric parameters and the process calibration data.

As the number of transistors increases, the number of nets in the design increases proportionally. This means process calibration data also increase significantly, resulting in an increase in parasitic extraction runtime and memory capacity requirement. Moreover, process calibration data often contain proprietary technology information which a manufacturer often wants to keep from disclosing. Accordingly, process calibration data are usually encrypted before being supplied to designers. The encryption further slows down a parasitic extraction process. A compact representation of process calibration data that addresses these challenges (extraction runtime, memory capacity and encryption) is highly desirable.

BRIEF SUMMARY OF THE DISCLOSED TECHNOLOGY

Aspects of the disclosed technology relate to techniques of parasitic extraction using compact representation of process calibration data. In one aspect, there is a method comprising: receiving a layout design; extracting geometric information of a layout feature in the layout design, the geometric information comprising geometric parameters; computing parasitic values associated with the layout feature based on the geometric information, the computing parasitic values comprising running one or more executable files selected in a plurality of executable files, the plurality of executable files being a compact representation of process calibration data; and storing the parasitic values.

The method may further comprise: performing a post-layout verification process using the parasitic values. The post-layout verification process may comprise electrostatic discharge (ESD) checking, timing analysis or both.

The plurality of executable files may be in a form of dynamically linkable code. The plurality of executable files may be generated using C++ code and a C++ code compiler. The original process calibration data are in a form of empirical formulas, look-up tables or both.

In another aspect, there is one or more computer-readable media storing computer-executable instructions for causing one or more processors to perform the above method.

In still another aspect, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Various aspects of the present disclosed technology relate to techniques of parasitic extraction using compact representation of process calibration data. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "extract" and "compute" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one micro device, such as data to be used to form multiple micro devices on a single wafer.

Illustrative Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

Figure 1:
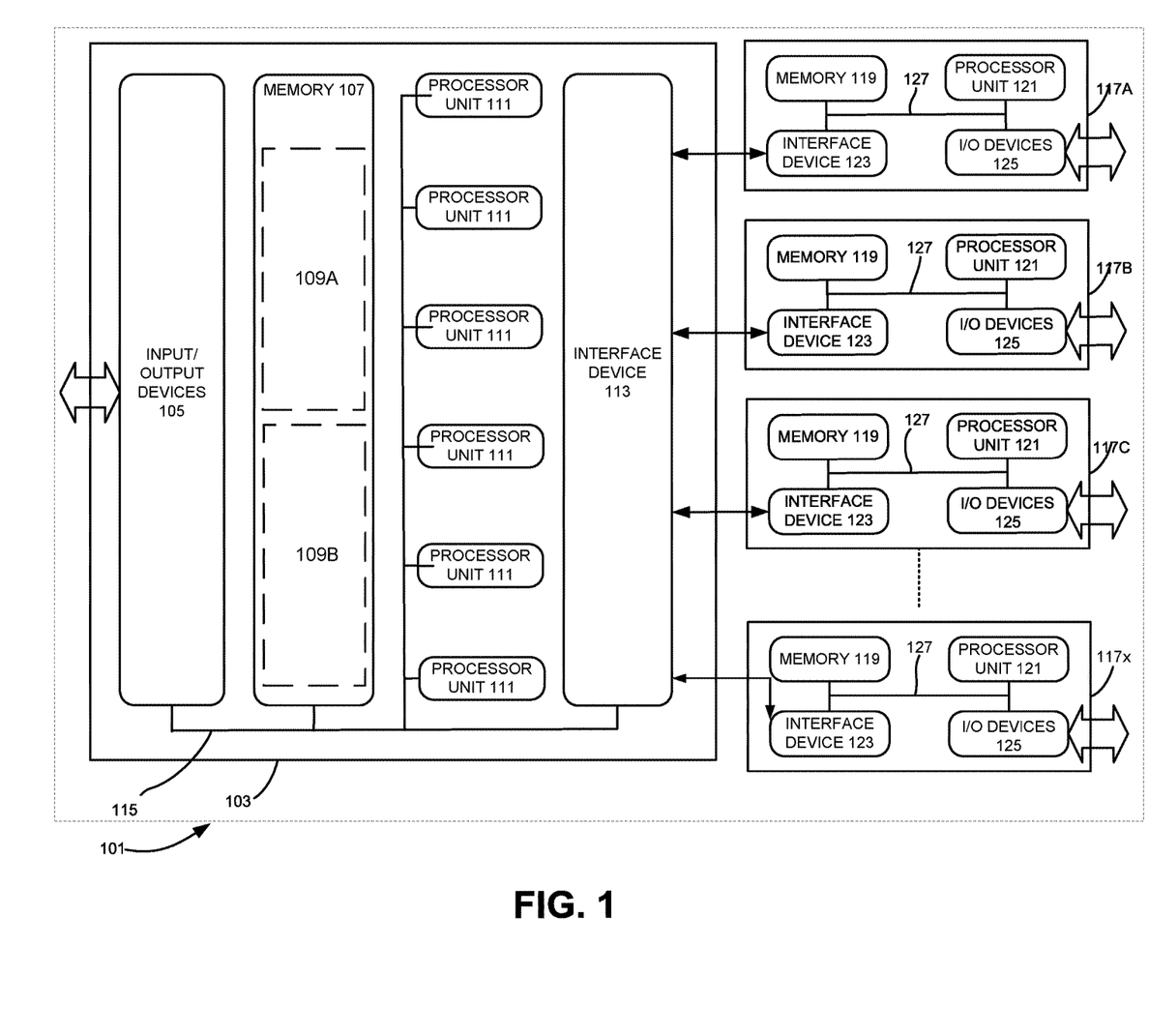
FIG. 1 illustrates an example of a computing system that may be used to implement various embodiments of the disclosed technology.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
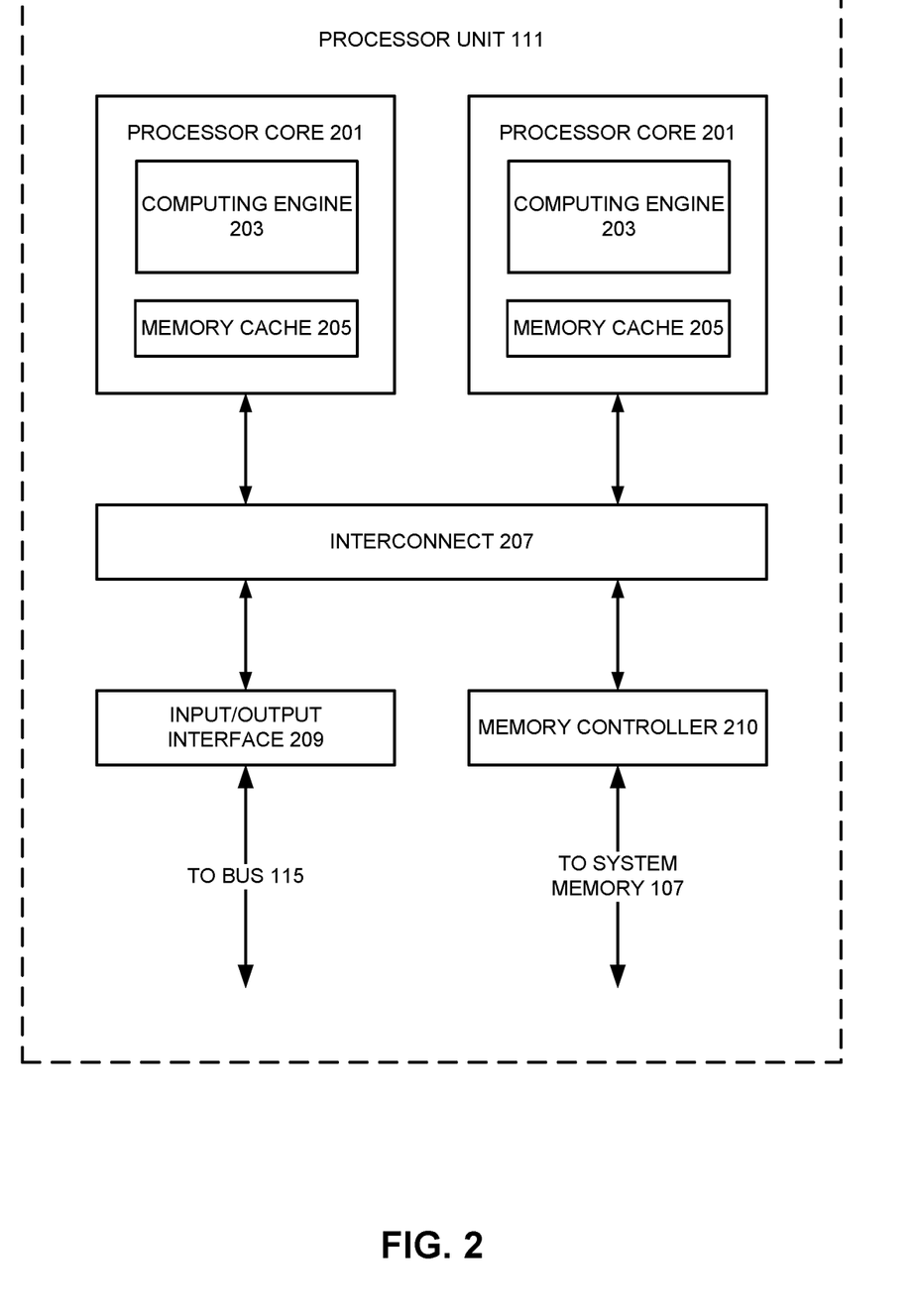
FIG. 2 illustrates an example of a multi-core processor unit that may be used to implement various embodiments of the disclosed technology.

With some implementations of the disclosed technology, the master computing device 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIGS. 1 and 2 is provided as an example only, and it not intended to suggest any limitation as to the scope of use or functionality of alternate embodiments of the disclosed technology.

Design Flow and Parasitic Extraction

Electronic circuits, such as integrated microcircuits, are used in a variety of products, from automobiles to microwaves to personal computers. Designing and fabricating integrated circuit devices typically involves many steps, sometimes referred to as a "design flow." The particular steps of a design flow often are dependent upon the type of integrated circuit, its complexity, the design team, and the integrated circuit fabricator or foundry that will manufacture the microcircuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, automated place and route tools will be used to define the physical layouts, especially of wires that will be used to interconnect the circuit devices. Each layer of the microcircuit will have a corresponding layer representation in the layout design, and the geometric shapes described in a layer representation will define the relative locations of the circuit elements that will make up the circuit device. For example, shapes in the layer representation of a metal layer will define the locations of the metal wires used to connect the circuit devices. Custom layout editors, such as Mentor Graphics' IC Station or Cadence's Virtuoso, allow a designer to custom design the layout, which is mainly used for analog, mixed-signal, RF, and standard-cell designs.

Integrated circuit layout descriptions can be provided in many different formats. The Graphic Data System II (GDSII) format is a popular format for transferring and archiving two-dimensional graphical IC layout data. Among other features, it contains a hierarchy of structures, each structure containing layout elements (e.g., polygons, paths or polylines, circles and textboxes). Other formats include an open source format named Open Access, Milkyway by Synopsys, Inc., EDDM by Mentor Graphics Corporation, and the more recent Open Artwork System Interchange Standard (OASIS) proposed by Semiconductor Equipment and Materials International (SEMI). These various industry formats are used to define the geometrical information in IC layout designs that are employed to manufacture integrated circuits.

Typically, a designer will perform a number of verification processes on the layout design. For example, the layout design may be analyzed to confirm that it accurately represents the circuit devices and their relationships described in the device design. In this process, a LVS (layout versus schematic) tool extracts a netlist from the layout design and compares it with the netlist taken from the circuit schematic. LVS can be augmented by formal equivalence checking, which checks whether two circuits perform exactly the same function without demanding isomorphism.

The layout design also may be analyzed to confirm that it complies with various design requirements, such as minimum spacings between geometric elements. In this process, a DRC (design rule checking) tool takes as input a layout in the GDSII standard format and a list of rules specific to the semiconductor process chosen for fabrication. A set of rules for a particular process is referred to as a run-set, rule deck, or just a deck. An example of the format of a rule deck is the Standard Verification Rule Format (SVRF) by Mentor Graphics Corporation.

Still further, electrical rule checking (ERC) include geometric and electric checks at the layout level. An ERC tool such as Calibre PERC available from Mentor Graphics Corporation can incorporate layout-related parameters into a circuit topological view to perform electrostatic discharge (ESD), electrical overstress (EOS) and multiple power domain checks.

ERC and some other post-layout verification processes such as those for timing analysis and signal integrity analysis requires parasitic extraction. Parasitic devices, in contrast to designed devices, are not explicitly intended by the designer but are inherent in the layout of the circuit. A parasitic extraction tool may includes a unit that is used by the manufacturer to obtain process calibration data for various layout patterns and a unit that is used by the designer to extract geometric parameters of layout features from the layout design and to calculate parasitic values based on the extracted geometric parameters and the process calibration data.

To counteract limitations in the manufacturing process, the layout design may be modified and may also include redundant or other compensatory geometric elements. Once the microcircuit device design is finalized, the layout portion of the design can be used by fabrication tools to manufacture the device using a photolithographic process.

Parasitic Extraction Tool

Figure 3:
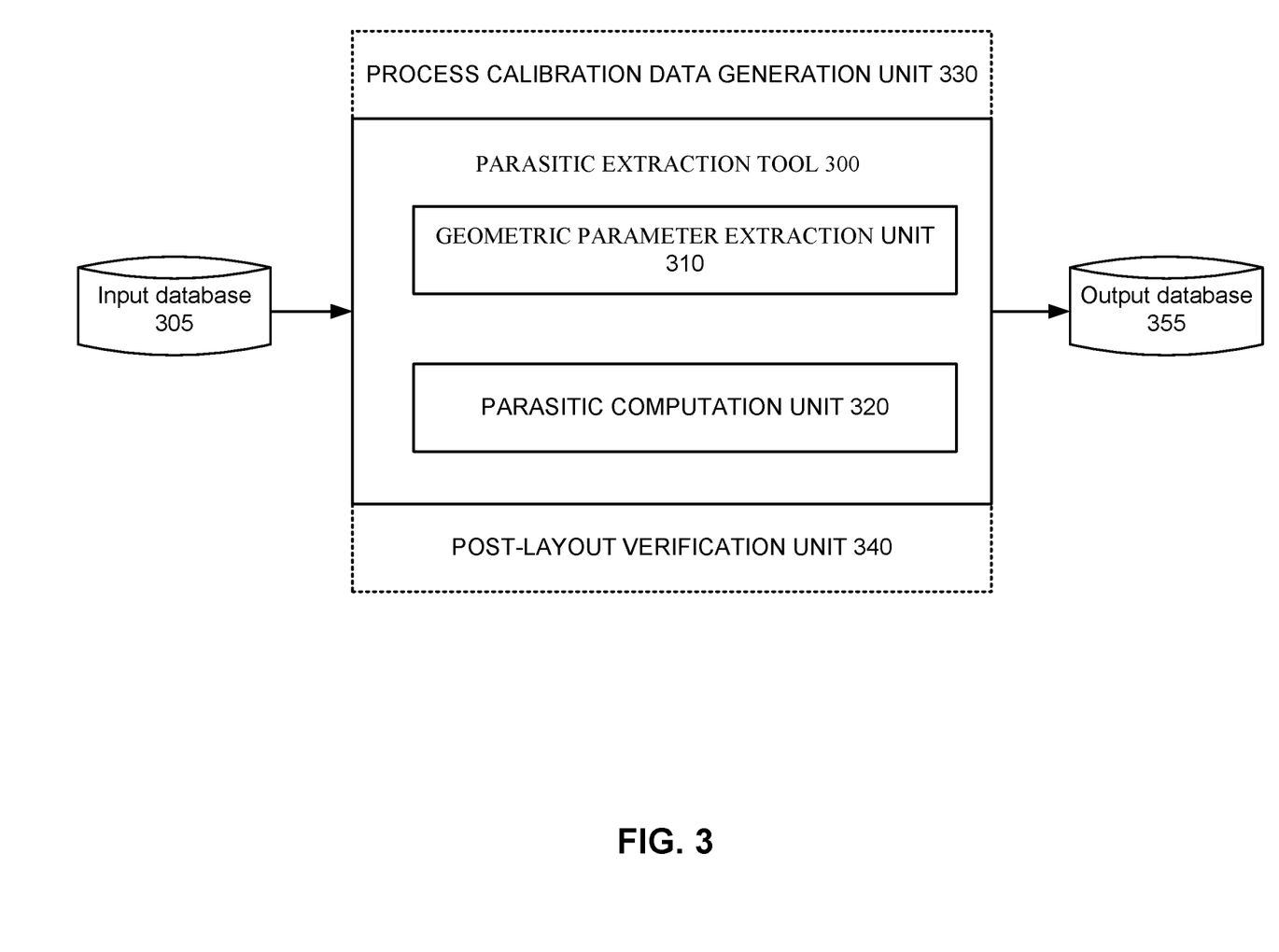
FIG. 3 illustrates an example of a parasitic extraction tool according to various embodiments of the disclosed technology.

FIG. 3 illustrates an example of a parasitic extraction tool 300 that may be implemented according to various embodiments of the disclosed technology. As seen in this figure, the context-aware patent matching tool 300 includes a geometric parameter extraction unit 310 and a parasitic computation unit 320. Some implementations of the parasitic extraction tool 300 may cooperate with (or incorporate) one or more of a process calibration data generation unit 330, a post-layout verification unit 340, an input database 305 and an output database 355.

As will be discussed in more detail below, the parasitic extraction tool 300 can receive a layout design from the input database 305. The geometric parameter extraction unit 310 extracts geometric information of a layout feature in the layout design. The geometric information comprises geometric parameters and layer information. The parasitic computation unit 320 computes parasitic values associated with the layout feature based on the geometric information. The computing parasitic values comprises running one or more executable files selected in a plurality of executable files. The plurality of executable files are a compact representation of process calibration data. Both the plurality of executable files are a compact representation of process calibration data may be generated by the process calibration data generation unit 330. The parasitic extraction tool 300 stores the parasitic values in the output database 355. The post-layout verification unit 340 can performs a post-layout verification process using the parasitic values.

As previously noted, various examples of the disclosed technology may be implemented by one or more computing systems, such as the computing system illustrated in FIGS. 1 and 2. Accordingly, one or more of the geometric parameter extraction unit 310, the parasitic computation unit 320, the process calibration data generation unit 330, and the post-layout verification unit 340 may be implemented by executing programming instructions on one or more processors in one or more computing systems, such as the computing system illustrated in FIGS. 1 and 2. Correspondingly, some other embodiments of the disclosed technology may be implemented by software instructions, stored on a non-transitory computer-readable medium, for instructing one or more programmable computers/computer systems to perform the functions of one or more of the geometric parameter extraction unit 310, the parasitic computation unit 320, the process calibration data generation unit 330, and the post-layout verification unit 340. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It also should be appreciated that, while the geometric parameter extraction unit 310, the parasitic computation unit 320, the process calibration data generation unit 330, and the post-layout verification unit 340 are shown as separate units in FIG. 3, a single computer (or a single processor within a master computer) or a single computer system may be used to implement all of these units at different times, or components of these units at different times.

With various examples of the disclosed technology, the input database 305 and the output database 355 may be implemented using any suitable computer readable storage device. That is, either of the input database 305 and the output database 355 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 305 and the output database 355 are shown as separate units in FIG. 3, a single data storage medium may be used to implement some or all of these databases.

Parasitic Extraction using Compact Representation of Process Calibration Data

Figure 4:
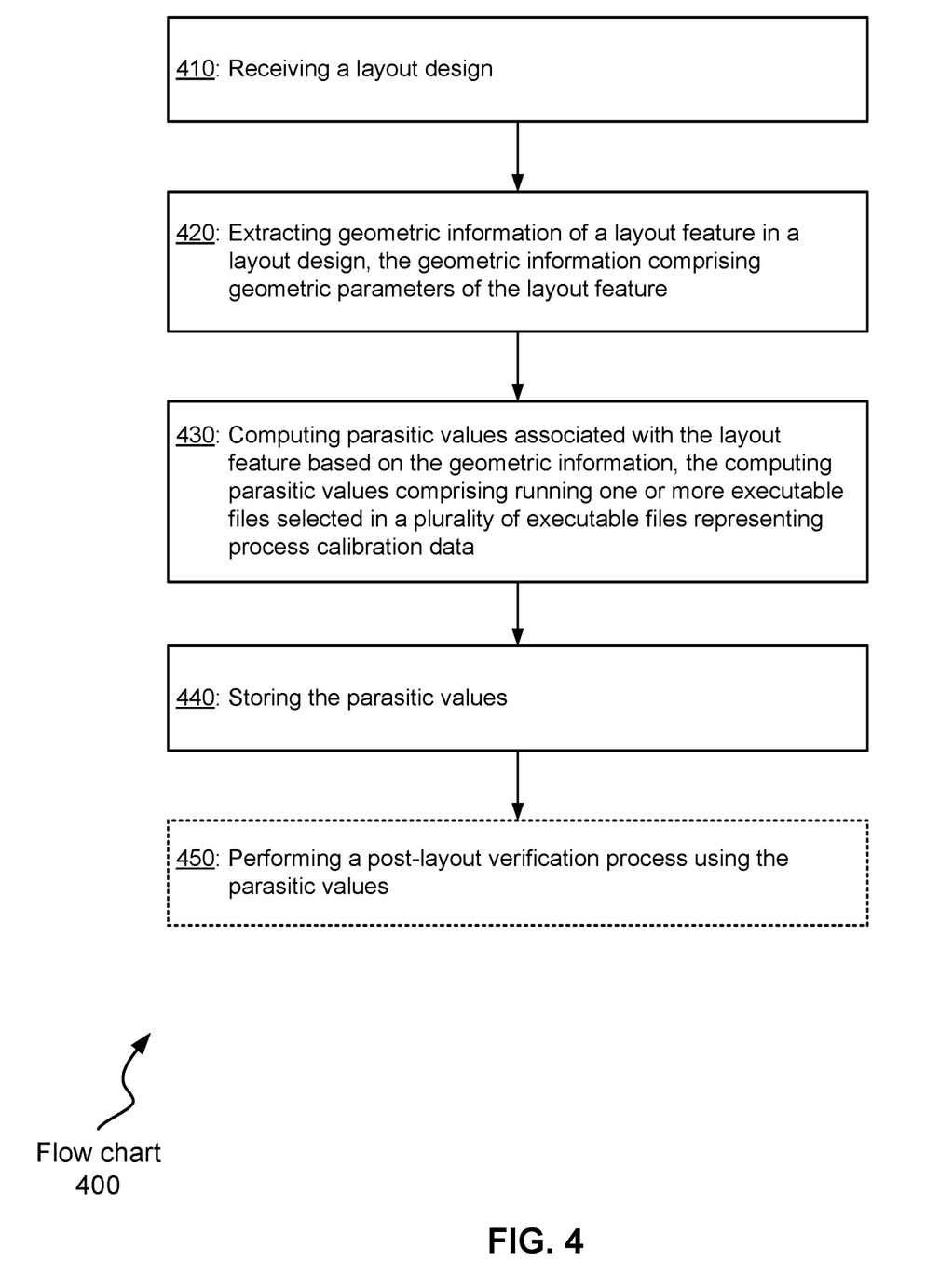
FIG. 4 illustrates a flowchart showing a process of parasitic extraction using compact representation of process calibration data that may be implemented according to various examples of the disclosed technology.

FIG. 4 illustrates a flowchart 400 showing a process of parasitic extraction using compact representation of process calibration data that may be implemented according to various examples of the disclosed technology. For ease of understanding, methods of parasitic extraction using compact representation of process calibration data that may be employed according to various embodiments of the disclosed technology will be described with reference to the parasitic extraction tool 300 in FIG. 3 and the flow chart 400 illustrated in FIG. 4. It should be appreciated, however, that alternate implementations of a parasitic extraction tool may be used to perform the methods of parasitic extraction using compact representation of process calibration data illustrated by the flow chart 400 according to various embodiments of the disclosed technology. Likewise, the parasitic extraction tool 300 may be employed to perform other methods of parasitic extraction using compact representation of process calibration data according to various embodiments of the disclosed technology.

In operation 410, the parasitic extraction tool 300 receives a layout design. In operation 420, the geometric parameter extraction unit 310 extracts geometric information of a layout feature in the layout design. The geometric information comprises geometric parameters of the layout feature. The geometric information may further comprise layer information of the layout feature. For parasitic resistance extraction, each resistive net associated with resistive interconnect layers can be broken into shapes. The layout feature can be a single shape and the extraction comprises determining the dimension of the shape. For capacitance extraction, the layout feature can be a pattern of geometric shapes and the extraction comprises determining the geometric parameters of the pattern of geometric shapes.

In operation 430, the parasitic computation unit 320 computes parasitic values associated with the layout feature based on the geometric information generated by the geometric parameter extraction unit 310. The computing parasitic values comprises running one or more executable files selected in a plurality of executable files. The plurality of executable files, a compact representation of original process calibration data, may be in a form of dynamically linkable code for the parasitic computation unit 320 to use.

The process calibration data generation unit 330 may be employed to generate the original process calibration data. For example, the process calibration data generation unit 330 may enumerate tens of thousands of test structures and simulate with capacitance field solvers. The resulting data are collected either to fit empirical formulas or to build look-up tables. With various implementations of the disclosed technology, the obtained process calibration data are converted to code such as C++ code, which is then compiled to the executable files. Each of the executable files may correspond to a particular pattern of shapes. The process calibration data generation unit 330 may use a pattern compression technique to reduce the number of patterns to be characterized. It should be appreciated that programing languages other than C++ (e.g., C or Fortran) can also be employed by the process calibration data generation unit 330 to generate the plurality of executable files.

The following is a parasitic capacitance table for a particular pattern:

```
capacitive_thickness (thickness_template_DxW) {
    // Derived from table THICKNESS_AP EQUATION
        index_1 (" 0.01, 0.034, 0.068, 0.102, 0.136,
    0.17, 0.204, 0.238, 0.272, 0.306, 0.34, 0.374, 0.408, 0.442,
    0.476, 0.51, 0.544, 0.578, 0.612, 0.646, 0.68, 0.714, 0.748,
    0.782, 0.816, 0.85, 0.884, 0.918, 0.952, 0.986, 0.99 ");
        index_2 (" 1.8, 2.7, 5.4, 10.8, 13.5 "); }
```

An example of a C++ file is:

```
void  capacitive_thickness (float index1, float index2, float& output)
{
    // Derived from table THICKNESS_AP EQUATION
    // C++ code to evaluate the table at (index1, index2)
    and return the cap }
```

This code is then compiled at the end of calibration using a standard C++ compiler to a .so file. During parasitic extraction, this .so file will be loaded (using dlopen). This step can be used to load multiple process corner tables, and does not need encryption as the function signatures are encrypted.

The following is an example of a via width table:

```
table = contact_width {
    co_co_spacing = { 0.0630 0.1890 0.3150 0.6300 1.2600 }
    gate_co_spacing = { 0.0270 0.0810 0.1890 0.3240 0.5400 }
    value = {
      0.028 0.001 0.001 0.001 0.001 ,
      0.028 0.001 0.001 0.001 0.001 ,
      0.028 0.001 0.001 0.001 0.001 ,
      0.028 0.001 0.001 0.001 0.001 ,
      0.028 0.001 0.001 0.001 0.001 }
  }
}
```

An example of a corresponding C++ code is:

```
Template <int NUM_DIM, typename T>
class Interpolant {
public:
    Interpolant( T* table);
    float eval(...);
};
• namespace Foundry {
  namespace Node {
    namespace typical_CLN_X1_Y1_M12 {
      extern float contact_width( float P1, float P2 ) {
        float[ ][ ] TAB = { 0.028 0.001 0.001 0.001 0.001, ... };
        static Interpolant<2,float> I1(TAB); // constructed once
        return I1.eval( P1, P2 );
      }
    } // for corner
  } // for Node
} // for Foundry
•
```

In operation 440, the parasitic extraction tool 300 stores the parasitic values.

Additionally, the post-layout verification unit 340 may perform a post-layout verification process using the parasitic values. The post-layout verification process comprises electrostatic discharge (ESD) checking, timing analysis or both.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes.

What is claimed is:

1. One or more non-transitory computer-readable media storing computer-executable instructions, the computer-executable instructions, when executed, causing one or more processors to perform a method, the method comprising:
   receiving a layout design;
   extracting geometric information of a layout feature in the layout design, the geometric information comprising geometric parameters of the layout feature;
   computing parasitic values associated with the layout feature based on the geometric information, the computing parasitic values comprising running one or more executable files selected in a plurality of executable files, the plurality of executable files being a compact representation of original process calibration data; and
   storing the parasitic values.

2. The one or more non-transitory computer-readable media recited in claim 1, wherein the plurality of executable files are in a form of dynamically linkable code.

3. The one or more non-transitory computer-readable media recited in claim 1, wherein the plurality of executable files are generated using C++ code and a C++ code compiler.

4. The one or more non-transitory computer-readable media recited in claim 1, wherein the original process calibration data are in a form of empirical formulas, look-up tables or both.

5. The one or more non-transitory computer-readable media recited in claim 1, wherein the method further comprises:
   performing a post-layout verification process using the parasitic values.

6. The one or more non-transitory computer-readable media recited in claim 5, wherein the post-layout verification process comprises electrostatic discharge (ESD) checking, timing analysis or both.

7. A method, executed by at least one processor of a computer, comprising:
   receiving a layout design;
   extracting, using the computer, geometric information of a layout feature in the layout design, the geometric information comprising geometric parameters of the layout feature;
   computing, using the computer, parasitic values associated with the layout feature based on the geometric information, the computing parasitic values comprising running one or more executable files selected in a plurality of executable files, the plurality of executable files being a compact representation of original process calibration data; and
   storing the parasitic values.

8. The method recited in claim 7, wherein the plurality of executable files are in a form of dynamically linkable code.

9. The method recited in claim 7, wherein the plurality of executable files are generated using C++ code and a C++ code compiler.

10. The method recited in claim 7, wherein the original process calibration data are in a form of empirical formulas, look-up tables or both.

11. The method recited in claim 7, further comprising:
    performing a post-layout verification process using the parasitic values.

12. The method recited in claim 11, wherein the post-layout verification process comprises electrostatic discharge (ESD) checking, timing analysis or both.

13. A system comprising:
    one or more processors, the one or more processors programmed to perform a method, the method comprising:
    receiving a layout design;
    extracting geometric information of a layout feature in the layout design, the geometric information comprising geometric parameters of the layout feature;
    computing parasitic values associated with the layout feature based on the geometric information, the computing parasitic values comprising running one or more executable files selected in a plurality of executable files, the plurality of executable files being a compact representation of original process calibration data; and storing the parasitic values.

14. The system recited in claim 13, wherein the plurality of executable files are in a form of dynamically linkable code.

15. The system recited in claim 13, wherein the plurality of executable files are generated using C++ code and a C++ code compiler.

16. The system recited in claim 13, wherein the original process calibration data are in a form of empirical formulas, look-up tables or both.

17. The system recited in claim 13, wherein the method further comprises:

performing a post-layout verification process using the parasitic values.

18. The system recited in claim 17, wherein the post-layout verification process comprises electrostatic discharge (ESD) checking, timing analysis or both.

* * * * *